(12) United States Patent
Meyer et al.

(10) Patent No.: US 12,510,197 B2
(45) Date of Patent: Dec. 30, 2025

(54) VALVE DEVICE WITH BALL LOCKS

(71) Applicant: AEROJET ROCKETDYNE, INC., Melbourne, FL (US)

(72) Inventors: David Meyer, Thousand Oaks, CA (US); Mario Padilla, Los Angeles, CA (US); Gary Grenon, Camarillo, CA (US)

(73) Assignee: AEROJET ROCKETDYNE, INC., Melbourne, FL (US)

( * ) Notice: Subject to any disclaimer, the term of this patent is extended or adjusted under 35 U.S.C. 154(b) by 0 days.

(21) Appl. No.: 18/803,369

(22) Filed: Aug. 13, 2024

(65) Prior Publication Data
US 2024/0401733 A1   Dec. 5, 2024

Related U.S. Application Data

(63) Continuation of application No. 17/920,456, filed as application No. PCT/US2020/029762 on Apr. 24, 2020, now Pat. No. 12,085,209.

(51) Int. Cl.
*F16K 15/03* (2006.01)
*F16K 27/02* (2006.01)
*F16L 37/14* (2006.01)

(52) U.S. Cl.
CPC .......... *F16L 37/148* (2013.01); *F16K 15/033* (2013.01); *F16K 27/0227* (2013.01)

(58) Field of Classification Search
CPC .................. F16K 15/033; F16K 27/0227
See application file for complete search history.

(56) References Cited

U.S. PATENT DOCUMENTS 1,575,607 A * 3/1926 Adams, Jr. ........... A62C 35/645
                                                              169/22
5,209,262 A   5/1993 Carow et al.
(Continued)

FOREIGN PATENT DOCUMENTS

CA        716470     8/1965
DE       2902278     5/1980
(Continued)

OTHER PUBLICATIONS

European Office Action for European Patent Application No. 20731254.7 mailed Nov. 29, 2024.
(Continued)

*Primary Examiner* — P. Macade Nichols
(74) *Attorney, Agent, or Firm* — Carlson, Gaskey & Olds, P.C.

(57) ABSTRACT

A valve device includes male and female housings having, respectively, exterior and interior annular channels. The male housing is receivable into the female housing such that the exterior and interior annular channels together define a toroidal tube. The male and female housings together define a fluid through-passage. There are first and second valve elements disposed, respectively, in the male and female housings. Ball locks are receivable into the toroidal tube. The ball locks axially lock the male and female housings together but permit rotation between the male and female housings. A lock includes first and second pin holes in, respectively, the male and female housings. The lock is engageable to rotationally lock the male and female housings when the first and second pin holes are in alignment.

15 Claims, 3 Drawing Sheets

(56) References Cited

U.S. PATENT DOCUMENTS

| | | | |
|---|---|---|---|
| 6,371,527 | B1 | 4/2002 | Ungchusri et al. |
| 10,436,363 | B2 | 10/2019 | Michot |
| 2015/0028585 | A1 | 1/2015 | McLaughlin et al. |
| 2015/0042088 | A1 | 2/2015 | Witkowski et al. |
| 2021/0310572 | A1* | 10/2021 | Karino .................. F16K 15/16 |
| 2023/0417343 | A1* | 12/2023 | Feenstra ............. F16K 15/1821 |

FOREIGN PATENT DOCUMENTS

| | | |
|---|---|---|
| DE | 9413445 | 10/1994 |
| GB | 682591 | 11/1952 |

OTHER PUBLICATIONS

International Search Report and Written Opinion for International Application No. PCT/US2020/029762 mailed Dec. 18, 2020.
Swivel Joints Catalog. OPW Engineered Systems. Retrieved from: http://www.ezm-rohrdrehgelenke.de/55/Swivel-joints.htm.
International Preliminary Report on Patentability for International Application No. PCT/US2020/029762 mailed Nov. 3, 2022.

* cited by examiner

VALVE DEVICE WITH BALL LOCKS

BACKGROUND

Check valves are used in fluid ducts to allow fluid flow in only one direction. There are a wide variety of types of check valves, such as ball check valves, diaphragm check valves, flapper check valves, and disc check valves. Often, the check valve is situated in a single valve body that is mounted in-line in the duct. The valve elements, such as the ball, diaphragm, flapper, or disc, as well as associated seals and springs, are assembled into the valve body.

SUMMARY

A valve device according to an example of the present disclosure includes male and female housings having, respectively, exterior and interior annular channels. The male housing is receivable into the female housing such that the exterior and interior annular channels together define a toroidal tube. The male and female housings together define a fluid through-passage. There are first and second valve elements disposed, respectively, in the male and female housings. Ball locks are receivable into the toroidal tube. The ball locks axially lock the male and female housings together but permit rotation between the male and female housings. A lock includes first and second pin holes in, respectively, the male and female housings. The lock is engageable to rotationally lock the male and female housings when the first and second pin holes are in alignment.

A method of assembling a valve device according to an example of the present disclosure includes providing male and female housings that have, respectively, exterior and interior annular channels. First and second valve elements are disposed, respectively, in the male and female housings. The male housing is inserted into the female housing such that the exterior and interior annular channels together define a toroidal tube, and the male and female housings together define a fluid through-passage. A lock is engaged when the first and second valve elements are in functional alignment and rotationally locks the male and female housings. Ball locks are inserted into the toroidal tube and axially lock the male and female housings together.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
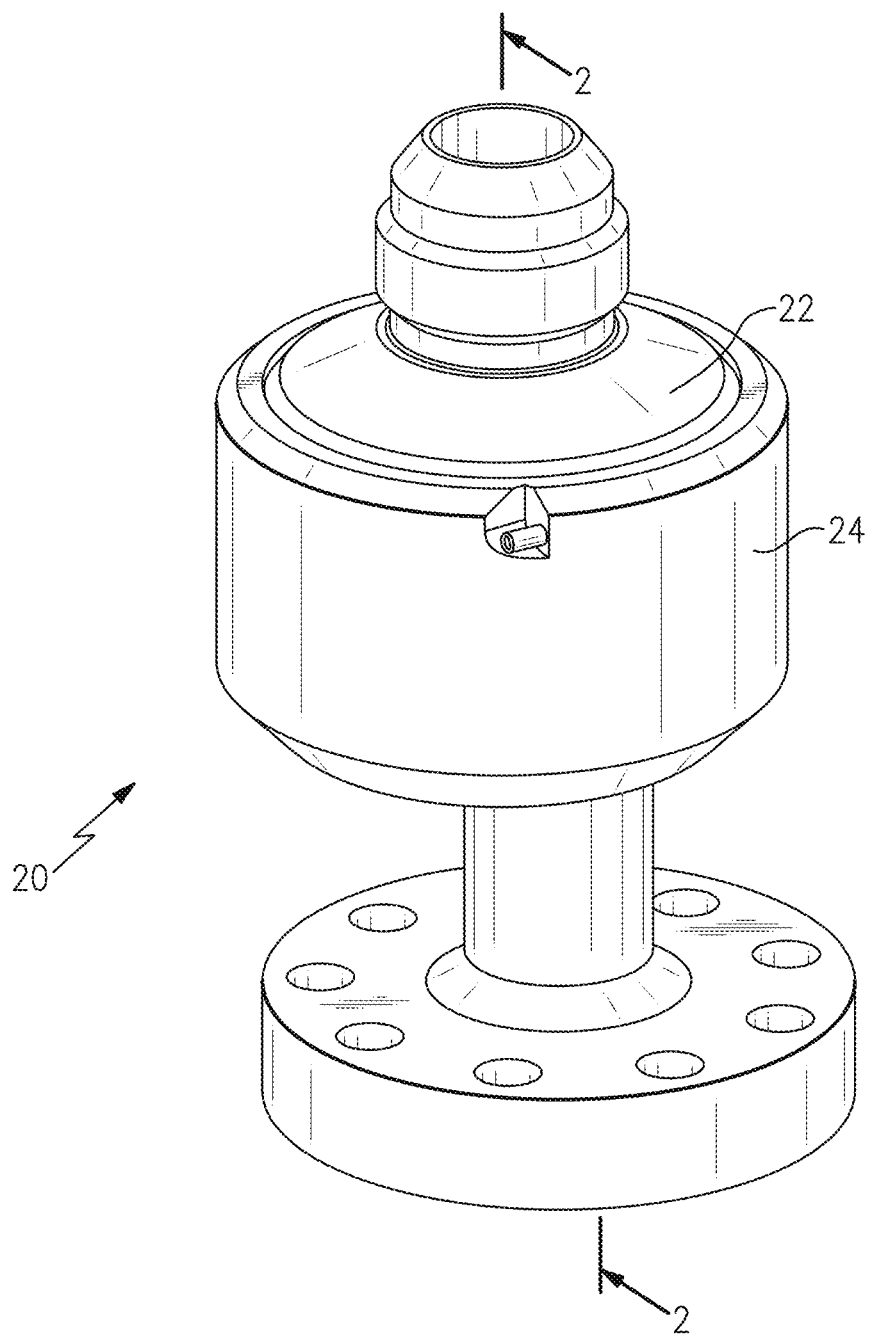
FIG. 1 illustrates an example valve device.
Figure 2:
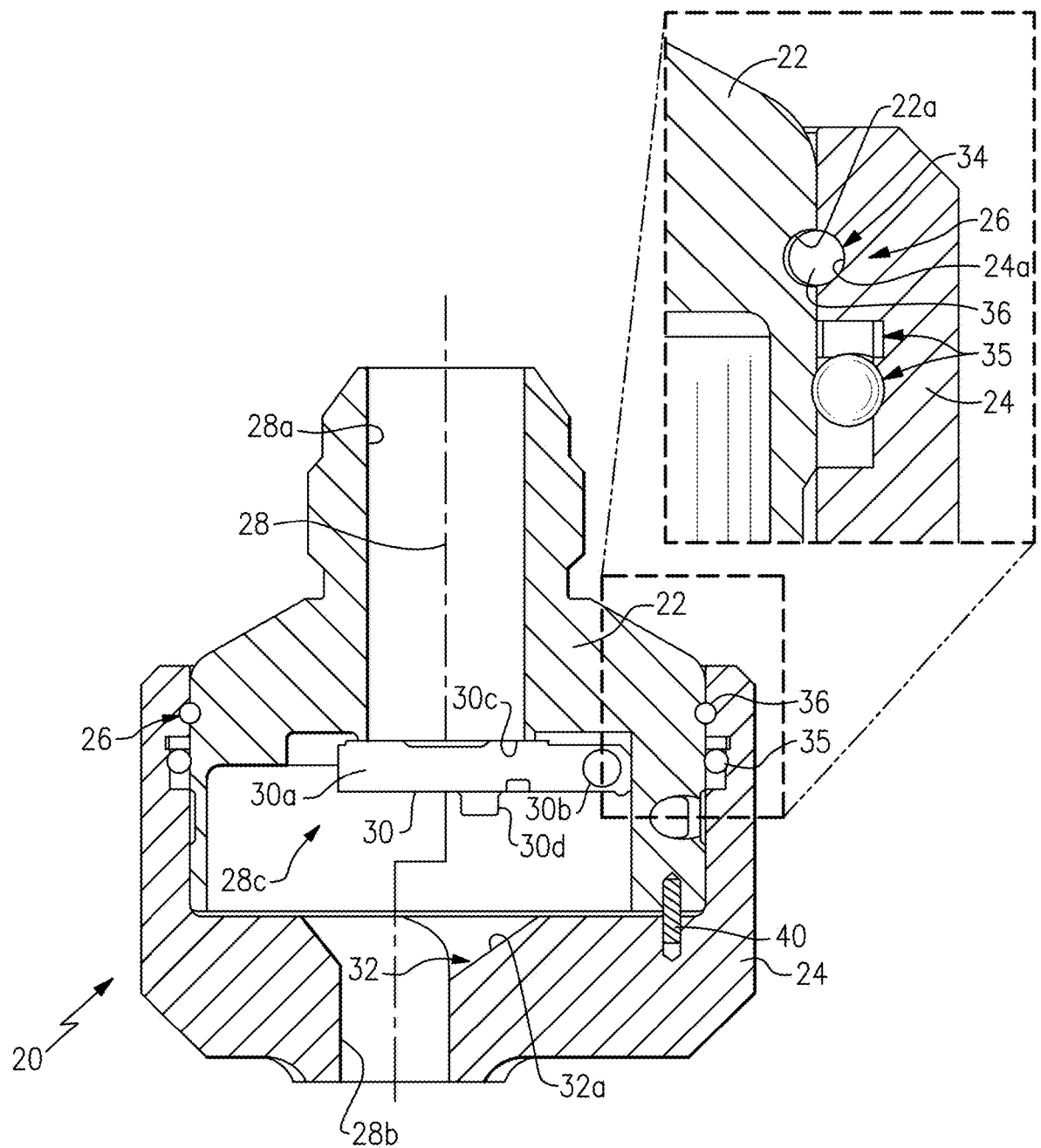
FIG. 2 illustrates a sectioned view of the valve device of FIG. 1.

FIG. 1 schematically illustrates a valve device 20, and FIG. 2 illustrates a sectioned view of the valve device 20. The valve device 20 is a check valve and will be described herein as a flapper type of check valve. It is to be understood, however, that the examples herein may also be of benefit to other types of check valves.

In general, the valve device 20 has a two-piece body that includes male and female housings 22/24 that are secured together in a ball joint 26. The male and female housings 22/24 are generally cylindrical and are of complementary geometry such that the male housing 22 nests in the female housing 24. The male and female housings 22/24 may be formed of a relatively strong material, such as a metal or metal alloy. In one example, each of the male and female housings 22/24 are of single-piece, monolithic construction.

The male and female housings 22/24 together define a fluid through-passage 28. In this example, the fluid through-passage 28 includes a first or inlet passage 28a that opens to the open interior region of the male housing 22, a second or outlet passage 28b that opens to the open interior region of the female housing 24, and an intermediate passage 28c through the intersecting open interior regions of the male and female housings 22/24. As shown, each of the first and second passages 28a/28b are straight along their central axes but are non-coaxial with one another.

The valve device 20 further includes first and second valve elements 30/32 disposed, respectively, in the male and female housings 22/24. In the example shown, the first valve element 30 is a flapper 30a, and the second valve element 32 is a flapper stop 32a. The terminology "first" and "second" as used herein is to differentiate that there are two architecturally distinct components or features. The flapper 30a may comprise a gate or disc that is pivotably mounted on a pin in the male housing 22, with a bias spring 30b that biases the flapper 30a to a closed position against valve seat 30c. The bias spring 30b has a spring constant that is selected to provide a desired opening pressure at which fluid moves the flapper 30a off of the valve seat 30c to permit fluid through-flow. It is to be understood that the terms "first" and "second" are interchangeable in the embodiments herein in that a first component or feature could alternatively be termed as the second component or feature, and vice versa. For example, the flapper 30a may alternatively be in the female housing 24 and the flapper stop 32a in the male housing 22.

The flapper stop 32a is situated in the pivot path of the flapper 30a and limits the stroke of the flapper 30a, thereby defining the maximum flow area through the fluid through-passage 28. For instance, the flapper stop 32a is a surface that is integrally formed with the female housing 24 and is complementarily situated or oriented with respect to the flapper 30a to stop movement thereof. In this regard, the flapper 30a, the flapper stop 32a, or both may have bumpers or the like that serve as the contact location between the flapper 30a and the flapper stop 32a. In the example shown, the flapper 30a includes a bumper 30d that contacts the flapper stop 32a at full opening of the flapper 30a. The bumper 30d may facilitate limiting contact to a relatively small defined area on the flapper stop 32a. As will be appreciated, the flapper stop 32a may also have a like bumper, or the bumper 30d may alternatively be on the flapper stop 32a.

As best shown in the inset in FIG. 2, the male housing 22 has an exterior annular channel 22a and the female housing 24 has an interior annular channel 24a. When nested, the annular channels 22a/24a align and generally form a toroidal tube 34. In the illustrated example, the annular channels 22a/24a are each semi-circular such that the toroidal tube 34 has a circular cross-section. As will be appreciated, since the male and female housings 22/24 are slip-fit together, there may be play between the housings 22/2 such that the channels 22a/24a do not perfectly align. In this regard, the toroidal tube 34 itself is not sealed and may not be perfectly circular in cross-section. For high-pressure implementations, the valve device 20 may also include one or more annular seals 35, such as o-rings.

Figure 3:
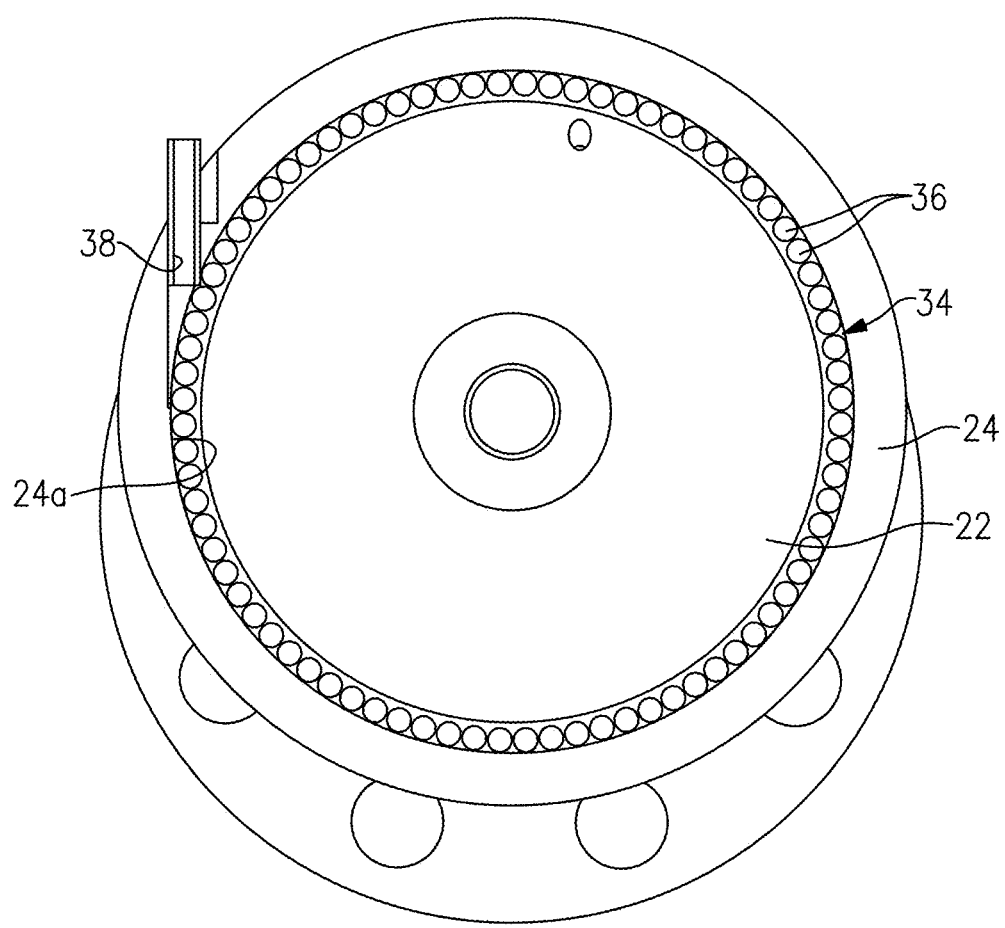
FIG. 3 illustrates an axial sectioned view of the valve device and ball locks.

Ball locks 36 are received into the toroidal tube 34. Each ball lock 36 is a spherical body that is marginally smaller in diameter than the diameter of the cross-section of the toroidal tube 34. In one example shown in a sectioned view through the toroidal tube 34 in FIG. 3, the ball locks 36 are inserted into the toroidal tube 34 via a ball lock port 38 in the female housing 24 that opens to the interior channel 24a. After insertion of the ball locks 36 into the toroidal tube 34, the port may be closed off using a closure 37, such as a pin, plug, threaded screw, or the like.

Once in the toroidal tube 34, each ball lock 36 is approximately half in the annular channel 22a and half in the annular channel 24a. Relative movement along the axis of one or the other of the male or female housings 22/24 generates a shear force along the interface between the annular channels 22a/24a. But for the ball locks 36, the male and female housings 22/24 would slide apart due to such shear. Due to the relatively tight packing of the ball locks 36 in the toroidal tube 34, however, the ball locks 36 are unable to move fully into either of the channels 22a/24a to be clear of the shear. The shear is thus borne by the ball locks 36, but since the ball locks 36 are constrained in the toroidal tube 34 the ball locks 36 do not permit the shear movement between the male and female housings 22/24. The ball locks 36 thereby axially lock the male and female housings 22/24 together.

In these regards, the ball locks 36 may be selected for relative strength and may be made of metal or metal alloy, such as steel for example. The ball locks 36 may also be packed tightly into the toroidal tube 34 such that the ball locks 36 form a continuous line of ball-to-ball contact. There may be a relatively small amount of play in the ball locks 36 to permit the last ball lock 36 to fit into the line. Such a line of contact may facilitate more uniform load distribution in comparison to using fewer ball locks, for example ball locks that are spaced apart by one or more ball diameters. The ball locks 36 also facilitate a relatively small size of the valve device 20, which find use in high pressure implementations such as those on the order of 10 ksi or higher. For example, the female housing 24 is less than two inches in diameter. Even at the low radius of curvature of the toroidal tube 34 for such as diameter, the ball locks 36 can readily roll in the toroidal tube 34 to facilitate insertion. As comparison, at the same radius of curvature, a metal wire lock member of similar diameter as the ball locks was unable to be inserted all the way around the tube due to wire stiffness and friction with the sides of the tube.

The ball locks 36 would permit rotational adjustment between the male and female housings 22/24 except for a rotational lock 40 (FIG. 2). To bring the first and second valve elements 30/32 into functional alignment, the male and female housings 22/24 are aligned during assembly (e.g., manually) relative to one another using the lock 40. In the illustrated example, the lock 40 is a pin lock in which the male and female housings 22/24 each include pin holes. Once engaged, the complementary pin prevents relative rotation between the male and female housings 22/24. The alignment of the pin holes may thus be indicative of proper functional alignment. The term "functional alignment" or variations thereof refers to alignment between the first and second valve elements 30/32 which permits the first and second valve elements 30/32 to function as designed.

As an example, in a functionally aligned state, the first and second valve elements 30/32 operate without interference and provide a predetermined design flow area through the fluid through-passage 28. In the example of the flapper 30a and flapper stop 32a, rotational misalignment between the male and female housings 22/24 may lead to a functional misalignment of contact regions between the flapper 30a and the flapper stop 32a that alters a predetermined design flow area to be outside of a target flow area range. While such variations in flow area from misalignment may be tolerable in some general purpose check valves, relatively small, high precision, high flow, and/or high pressure check valves may require precise flow areas and thus precise alignment. Such precise alignment may be challenging to achieve with other types of joints than with the ball joint 26. For instance, in a further example of the examples above, the female housing 24 is less than two inches in diameter and the toroidal tube 34 includes at least 80 of the ball locks 36. Moreover, as the ball locks 36 can be readily inserted and removed from the toroidal tube 34 via the ball lock port 38, the valve device 20 can relatively rapidly be assembled and disassembled, repeatedly if needed. Additionally, since the rotational adjustment is transient, and is prevented when the valve device 20 is in operation as a check valve, there is no need for the channels 22a/24a to be surface hardened (e.g., carburized) as in a bearing application.

The examples above also embody a method of assembling the valve device 20. For example, the method includes providing the male and female housings 22/24, inserting the male housing 22 into the female housing 24 such that the exterior and interior annular channels 22a/22b together define the toroidal tube 34, inserting the ball locks 36 into the toroidal tube 34 to axially lock the male and female housings 22/24 together, and engaging the lock 40 when the first and second valve elements 30/32 are in functional alignment so as to rotationally lock the male and female housings 22/24 together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A valve device comprising:
male and female housings having, respectively, exterior and interior annular channels, the male housing receivable into the female housing such that the exterior and interior annular channels together define a toroidal tube, and the male and female housings together define a fluid through-passage;
first and second valve elements disposed, respectively, in the male and female housings;
ball locks receivable into the toroidal tube, the ball locks axially locking the male and female housings together but permitting rotation between the male and female housings; and
a lock including first and second pin holes in, respectively, the male and female housings, the lock engageable to rotationally lock the male and female housings when the first and second pin holes are in alignment.

2. The valve device as recited in claim 1, wherein one of the first or second valve elements is a flapper and the other of the first or second valve elements is a flapper stop.

3. The valve device as recited in claim 2, wherein the flapper includes a spring.

4. The valve device as recited in claim 3, wherein the flapper includes a bumper.

5. The valve device as recited in claim 1, wherein the fluid through-passage includes a first passage that opens to the male housing, and a second passage that opens to the female housing.

6. The valve device as recited in claim 5, wherein the first and second passages are non-coaxial.

7. The valve device as recited in claim 1, wherein the exterior and interior channels are each semi-circular in cross-section.

8. The valve device as recited in claim 1, wherein the female housing includes a ball lock port that opens to the interior channel.

9. The valve device as recited in claim 1, wherein the female housing is less than two inches in diameter and the toroidal tube includes at least 80 of the ball locks.

10. The valve device as recited in claim 1, further comprising at least one seal between the male housing and the female housing.

11. The valve device as recited in claim 1, wherein the lock includes a pin receivable into the pin holes when the first and second pin holes are in alignment.

12. A method of assembling a valve device, the method comprising:

providing male and female housings that have, respectively, exterior and interior annular channels, and first and second valve elements disposed, respectively, in the male and female housings;

inserting the male housing into the female housing such that the exterior and interior annular channels together define a toroidal tube, and the male and female housings together define a fluid through-passage;

engaging a lock when the first and second valve elements are in functional alignment, the lock rotationally locks the male and female housings; and inserting ball locks into the toroidal tube, the ball locks axially lock the male and female housings together.

13. The method as recited in claim 12, wherein one of the first or second valve elements is a flapper and the other of the first or second valve elements is a flapper stop.

14. The method as recited in claim 12, wherein the flapper includes a spring.

15. The method as recited in claim 12, wherein the lock includes first and second pin holes in, respectively, the male and female housings, and the engaging includes inserting a lock pin into the first and second pin holes when the first and second pin holes are in alignment.

* * * * *